US008829741B2

(12) United States Patent
Park (10) Patent No.: US 8,829,741 B2
(45) Date of Patent: Sep. 9, 2014

(54) HORIZONTAL VIBRATION MOTOR (75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 287 days.

(21) Appl. No.: 13/222,257

(22) Filed: Aug. 31, 2011

(65) Prior Publication Data

US 2012/0049660 A1     Mar. 1, 2012

(30) Foreign Application Priority Data

Sep. 1, 2010 (KR) .......................... 10-2010-0085695

(51) Int. Cl.
*H02K 33/00* (2006.01)
*B06B 1/04* (2006.01)
*G06F 3/01* (2006.01)
*H02K 33/16* (2006.01)

(52) U.S. Cl.
CPC ............... *H02K 33/16* (2013.01); *B06B 1/045* (2013.01); *G06F 3/016* (2013.01)
USPC ............................................. 310/25; 310/81

(58) Field of Classification Search
USPC ............ 310/81, 15, 17, 20, 25, 26, 29, 36–38
IPC ..................................................... H02K 33/00
See application file for complete search history.

(56) References Cited

U.S. PATENT DOCUMENTS

| 7,288,863 | B2 * | 10/2007 | Kraus ............................. 310/37 |
| 7,355,305 | B2 * | 4/2008 | Nakamura et al. ......... 310/12.03 |
| 7,911,098 | B2 * | 3/2011 | Lee et al. ........................ 310/81 |
| 8,400,027 | B2 * | 3/2013 | Dong et al. ..................... 310/25 |
| 2011/0101797 | A1 * | 5/2011 | Lee et al. ........................ 310/29 |
| 2011/0316361 | A1 * | 12/2011 | Park et al. ....................... 310/25 |
| 2012/0153748 | A1 * | 6/2012 | Wauke ............................ 310/25 |
| 2012/0169148 | A1 * | 7/2012 | Kim et al. ....................... 310/25 |

* cited by examiner

*Primary Examiner* — Dang Le
(74) *Attorney, Agent, or Firm* — Saliwanchik, Lloyd & Eisenschenk

(57) ABSTRACT

Disclosed is a horizontal vibration motor, the motor including a stator having a coil block secured to a bottom plate of a case, a vibrator having magnets placed above the coil block and a weight holding the magnets, a first elastic member having a first elastic plate secured to portion of the case corresponding to a first corner of the weight, a second elastic plate bent inwards from the first elastic plate, and a third elastic plate bent outwards from the second elastic plate and secured to portion around a second corner, and a second elastic member having a fourth elastic plate secured to portion of the bottom plate corresponding to a third corner, a fifth elastic plate bent inwards from the fourth elastic plate, and a sixth elastic plate bent outwards from the fifth elastic plate and secured to a fourth corner.

7 Claims, 5 Drawing Sheets

HORIZONTAL VIBRATION MOTOR

CROSS-REFERENCE TO RELATED APPLICATION

This application claims the benefit under 35 U.S.C. §119 of Korean Patent Application No. 10-2010-0085695, filed Sep. 1, 2010, which is hereby incorporated by reference in its entirety.

BACKGROUND OF THE INVENTION

1. Field of the Invention

The present invention relates to a horizontal vibration motor.

2. Description of the Related Art

Recently, small electronic products, such as mobile communication equipment, portable game machines, portable MP3 players and small home game machines, have been developed. The above-mentioned small electronic products include a display unit for transmitting data in the form of an image, and a sound unit for transmitting data in the form of voice. In recent, vibration motors that transmit data using vibrations have been mounted to the small electronic products.

The vibration motors mounted to the small electronic products require compact size suitable for the small electronic product and durability for preventing damage caused by external shocks, falls, vibrations and other causes, in addition to the function of generating strong vibrations.

However, the conventional vibration motor is problematic in that its size is increased by the driving direction of a vibrator, and the vibration motor is prone to be damaged by external shocks, falls, vibrations and other causes.

BRIEF SUMMARY

Accordingly, the present invention provides a horizontal vibration motor, which may be manufactured in compact size to be suitable for a small electronic product, and improves the structure of an elastic member to prolong the lifespan of the elastic member.

In one general aspect of the present invention, there is provided a horizontal vibration motor, the motor comprising: a stator including a coil block that is secured to a bottom plate of a case; a vibrator including magnets placed above the coil block, and a weight holding the magnets, the weight having a shape of a rectangular frame; a first elastic member including a first elastic plate secured to a portion of the case corresponding to a first corner of the weight, a second elastic plate bent inwards from the first elastic plate, and a third elastic plate bent outwards from the second elastic plate and secured to a portion around a second corner that is adjacent to the first corner; and a second elastic member including a fourth elastic plate secured to a portion of the bottom plate corresponding to a third corner that is located in a diagonal direction of the first corner, a fifth elastic plate bent inwards from the fourth elastic plate, and a sixth elastic plate bent outwards from the fifth elastic plate and secured to a fourth corner that is located in a diagonal direction of the second corner, wherein a first gap between the first and second elastic plates or between the fourth and fifth elastic plates is wider than a second gap between the second and third elastic plates or between the fifth and sixth elastic plates.

In another general aspect of the present invention, there is provided a horizontal vibration motor, the motor comprising: a stator including a coil block that is secured to a bottom plate of a case; a vibrator including magnets placed above the coil block, and a weight holding the magnets, the weight having a shape of a rectangular frame; a first elastic member including a first elastic plate secured to a portion of the case corresponding to a first corner of the weight, and a second elastic plate bent inwards from the first elastic plate and secured to the first corner; and a second elastic member including a third elastic plate secured to a portion of the case corresponding to a second corner that is located in a diagonal direction of the first corner, and a fourth elastic plate bent inwards from the third elastic plate and secured to the second corner, wherein a first gap between the first and second elastic plates or between the third and fourth elastic plates is wider than a second gap between the second elastic plate and a first side surface of the weight facing the second elastic plate or between the fourth elastic plate and a second side surface of the weight facing the fourth elastic plate.

The horizontal vibration motor according to the present invention is advantageous in that the elastic member for elastically supporting a vibrator vibrating relative to a stator is secured to a side surface of a weight of the vibrator, thus leading to a considerable reduction in the volume and thickness of the motor, and the structure of the elastic member is improved, thus prolonging the lifespan of the elastic member.

DETAILED DESCRIPTION

Hereinafter, exemplary embodiments of the present invention will be described in detail with reference to the accompanying drawings. For clarity and convenience of description, the size or shape of components shown in the drawings may not be illustrated to scale. Further, terminologies defined in consideration of the construction and effect of the present invention may be changed according to a user or operator intention or the custom. These terminologies should be interpreted as having meanings and concepts in keeping with the technical spirit of the present invention based on the overall detailed description.

As may be used herein, the term of "substantially" provide an industry-accepted tolerance for its corresponding term and/or relatively between items. Such an industry-accepted tolerance ranges from less than one percent to ten percent and corresponds to, but is not limited to, component values, angles, etc.

Figure 1:
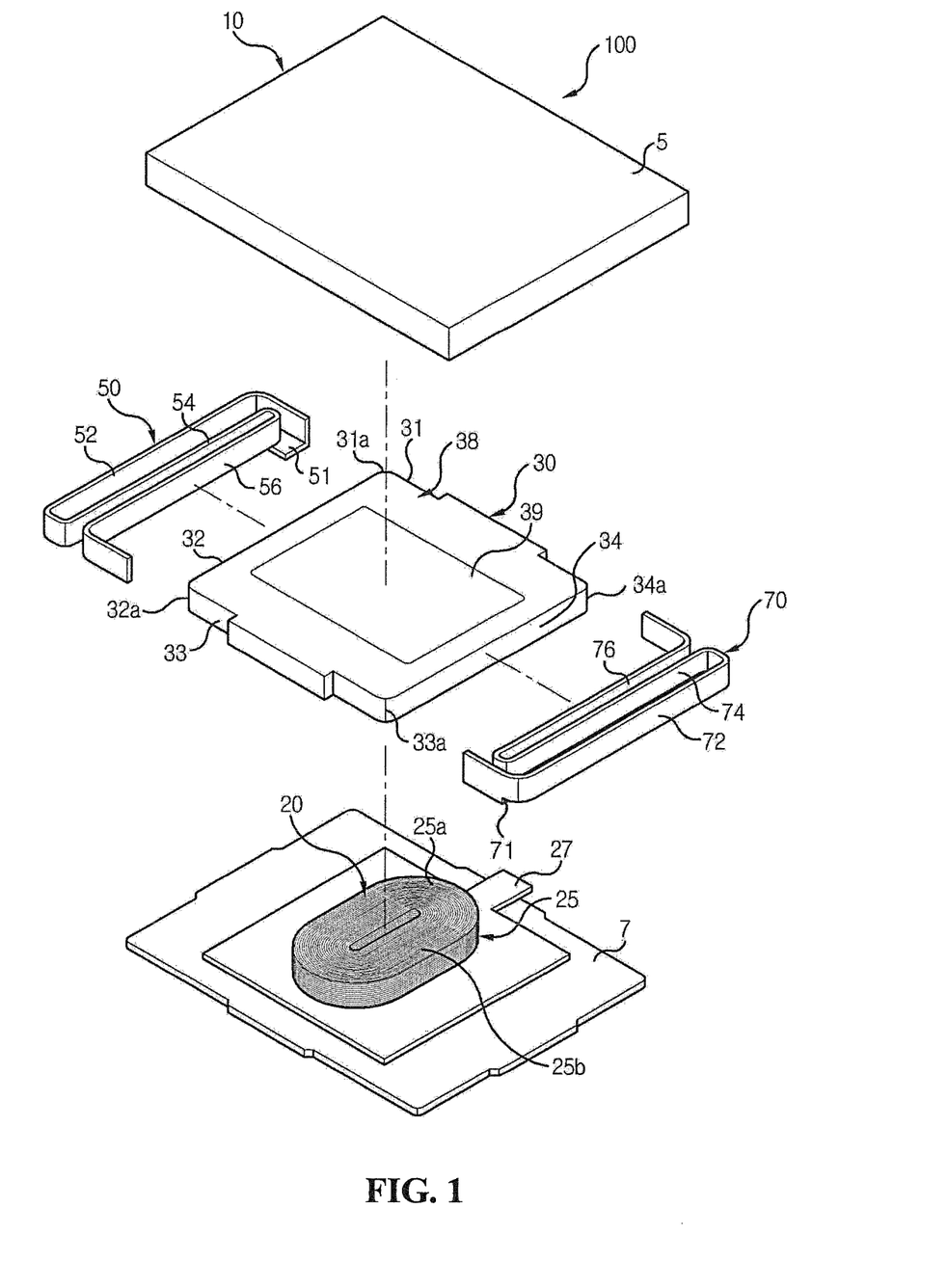
FIG. 1 is an exploded perspective view showing a horizontal vibration motor in accordance with an exemplary embodiment of the present invention.
Figure 2:
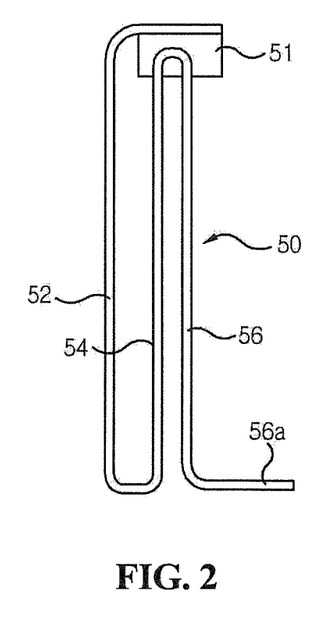
FIG. 2 is a plan view of a first elastic member shown in FIG. 1.
Figure 3:
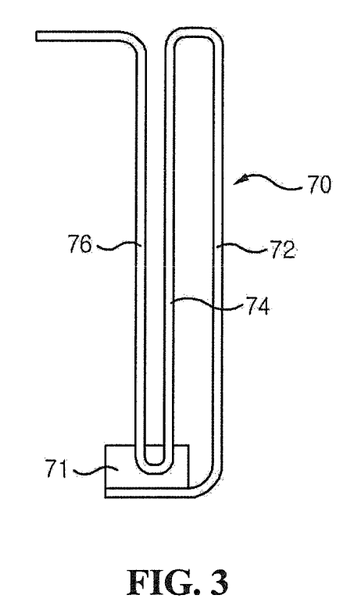
FIG. 3 is a plan view of a second elastic member shown in FIG. 1.
Figure 4:
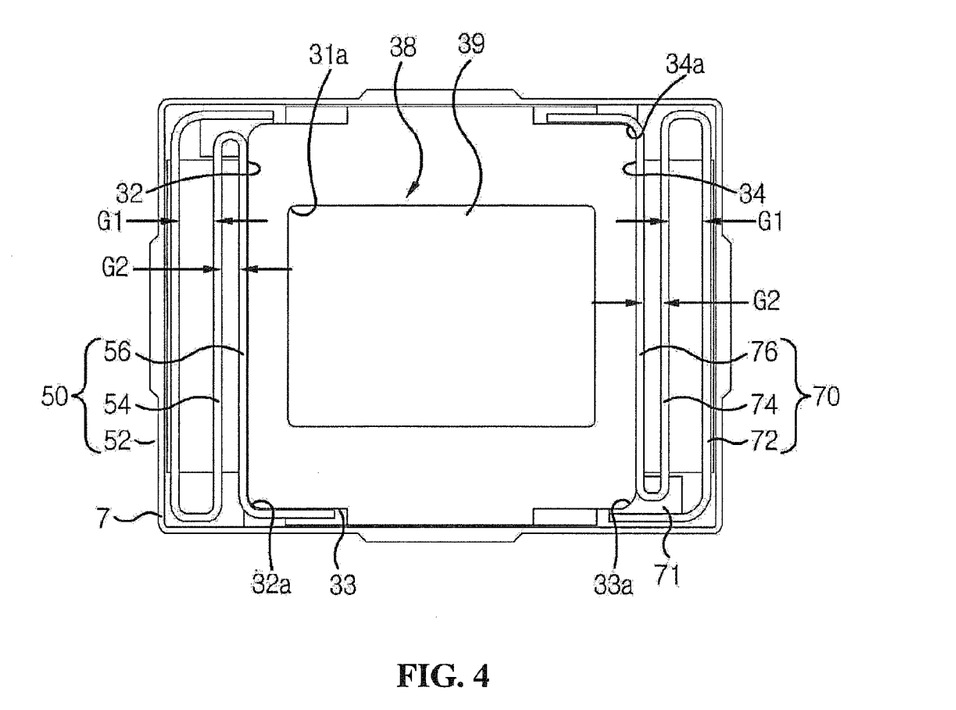
FIG. 4 is a plan view of the horizontal vibration motor shown in FIG. 1.
Figure 5:
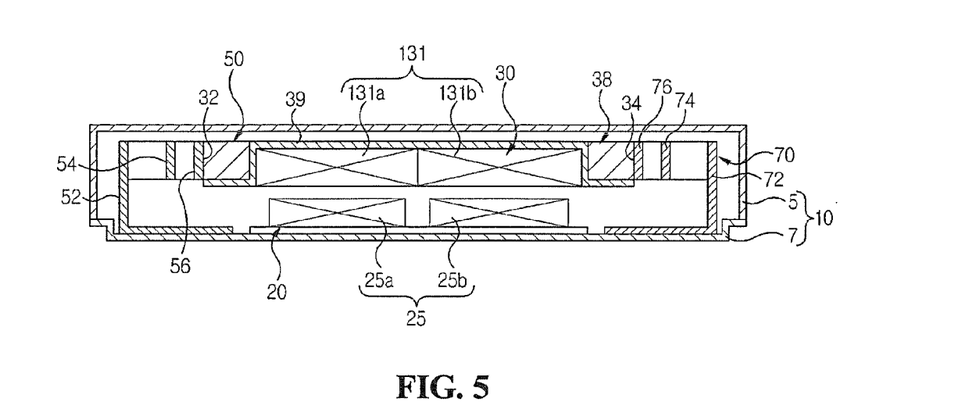
FIG. 5 is a vertical sectional view of the horizontal vibration motor shown in FIG. 4.

FIG. 1 is an exploded perspective view showing a horizontal vibration motor in accordance with an embodiment of the present invention. FIG. 2 is a plan view of a first elastic member shown in FIG. 1. FIG. 3 is a plan view of a second elastic member shown in FIG. 1. FIG. 4 is a plan view of the horizontal vibration motor shown in FIG. 1. FIG. 5 is a vertical sectional view of the horizontal vibration motor shown in FIG. 4.

Referring to FIGS. 1 to 5, a horizontal vibration motor 100 includes a case 10, a stator 20, a vibrator 30, a first elastic member 50, and a second elastic member 70.

The case 10 includes an upper case 5 and a lower case 7. The case 10 functions to house and hold the stator 20, the vibrator 30, the first elastic member 50 and the second elastic member 70 that will be described below in detail.

The upper case 5 is formed to have, for example, the shape of a rectangular box that is open at a bottom thereof. The upper case 5 may be formed by machining a metal plate which shields electromagnetic waves so as to shield the electromagnetic waves generated from the horizontal vibration motor 100.

The lower case 7 is formed to have, for example, the shape of a flat plate. The lower case 7 is combined with the upper case 5 to define a housing space in the case 10.

The stator 20 is placed on a top of the lower case 7 of the case 10. The stator 20 includes a coil block 25. The coil block 25 may be formed to have the shape of an oblong pillar with an oblong hole. If the coil block 25 has the shape of the oblong pillar with the oblong hole, an overlapping area between the coil block 25 and magnets that will be described below in detail may be considerably increased to further improve the driving efficiency of the horizontal vibration motor.

The coil block 25 is formed by winding a coil, and is electrically connected to a circuit board 27 which is interposed between the top of the lower case 7 and the coil block 25.

In the exemplary embodiment of the present invention, the coil block 25 is divided into a first coil block 25a and a second coil block 25b based on current direction. A current flows through the first and second coil blocks 25a and 25b in opposite directions, thus forming magnetic fields of opposite directions in the first and second coil blocks 25a and 25b.

The vibrator 30 is placed above the coil block 25. The vibrator 30 includes magnets 131 and a weight 38 as shown in FIG. 5. The vibrator 30 is moved leftwards or rightwards relative to the stator 20 by the attractive force and repulsive force which are generated by the magnetic fields produced from the stator 20.

The magnets 131 include a first magnet 131a and a second magnet 131b. Each of the first and second magnets 131a and 131b is formed in the shape of a bar magnet.

The first magnet 131a is formed at a position facing the first coil block 25a of the coil block 25, while the second magnet 131b is formed at a position facing the second coil block 25b of the coil block 25.

The first magnet 131a produces a magnetic field which generates the attractive or repulsive force by the magnetic field produced from the first coil block 25a. The second magnet 131b produces a magnetic field which generates the attractive or repulsive force by the magnetic field produced from the second coil block 25b.

Turning back to FIG. 1, the weight 38 is formed to have the shape of a rectangular frame with a rectangular opening, when viewed on the plane. The weight 38 is coupled to the magnets 131 to increase vibration. According to the embodiment of this invention, the weight 38 may include a metal.

Hereinafter, four side surfaces of the weight 38 each having the shape of the rectangular frame will be defined as first to fourth side surfaces 31, 32, 33, and 34.

Further, a corner formed by the first and second side surfaces 31 and 32 is designated as a first corner 31a, a corner formed by the second and third side surfaces 32 and 33 is designated as a second corner 32a, a corner located in a diagonal direction relative to the first corner 31a is designated as a third corner 33a, and a corner located in a diagonal direction relative to the second corner 32a is designated as a fourth corner 34a.

Referring to FIGS. 1 to 3, the first elastic member 50 includes a first elastic plate 52, a second elastic plate 54, and a third elastic plate 56. In the embodiment of this invention, the first elastic member 50 functions to drive the vibrator 30, which has been driven to a first side of the stator 20 by the stator 20, to a second side of the stator 20.

Each of the first to third elastic plates 52, 54, and 56 constituting the first elastic member 50 is formed in the shape of a band, the length of which is larger than width. The first to third elastic plates 52, 54, and 56 are formed to be perpendicular to the top of the lower case 7.

The perpendicular formation of the first to third elastic plates 52, 54, and 56 relative to the top of the lower case 7 enables the vibrator 30 to be elastically supported, and prevents the vibrator 30 from sagging toward the stator 20.

To be more specific, in a case where the vibrator 30 with a weight of about 1.5 g is coupled to the first and second elastic members 50 and 70, the vibrator 30 rarely sags, that is, sags by the height of about 0.0041 mm.

Therefore, it is not necessary to provide an anti-sagging member for preventing the sagging of the vibrator 30 such as a ball bearing between the vibrator 30 and the top of the lower case 7 in order to prevent the vibrator 30 from sagging toward the stator 20.

The first elastic plate 52 is secured to the top of the lower case 7 of the case 10. Here, the first elastic plate 52 is secured to the top of the lower case 7 via a coupling piece 51. The coupling piece 51 extends from an end of the first elastic plate 52 in such a way as to be parallel to the top of the lower case 7. The coupling piece 51 is coupled to portion of the top of the lower case 7, which is adjacent to the first corner 31a of the weight 38.

The first elastic plate 52 secured to the top of the lower case 7 via the coupling piece 51 is placed to be substantially parallel to the second side surface 32 of the weight 38.

The second elastic plate 54 extends from the first elastic plate 52 in such a way as to be bent between the first elastic plate 52 and the second side surface 32 of the weight 38. The second elastic plate 54 is placed to be parallel to the second side surface 32 of the weight 38. That is, the second elastic plate 54 is formed by bending the first elastic plate 52 in a first direction facing the second side surface 32 of the weight 38.

The third elastic plate 56 extends from the second elastic plate 54 in such a way as to be bent between the second elastic plate 54 and the second side surface 32 of the weight 38. The third elastic plate 56 is placed to be parallel to the second side surface 32 of the weight 38. That is, the third elastic plate 56 is formed by bending the second elastic plate 54 in a second direction that faces the second side surface 32 of the weight 38 and is opposite to the first direction.

A portion of the third elastic plate 56 is bent to be parallel to the third side surface 33 of the weight 38 and is secured to portion of the third side surface 33, which is located around the second corner 32a.

Referring to FIGS. 1 to 4, the second elastic member 70 includes a fourth elastic plate 72, a fifth elastic plate 74, and a sixth elastic plate 76. In the embodiment of the present invention, the second elastic member 70 functions to drive the vibrator 30, which has been driven to a first side of the stator 20 by the stator 20, to a second side of the stator 20.

Each of the fourth to sixth elastic plates 72, 74, and 76 constituting the second elastic member 70 is formed in the shape of a band, the length of which is larger than width. The fourth to sixth elastic plates 72, 74, and 76 are formed to be perpendicular to the top of the lower case 7.

The perpendicular formation of the fourth to sixth elastic plates 72, 74, and 76 relative to the top of the lower case 7 enables the vibrator 30 to be elastically supported, and prevents the vibrator 30 from sagging toward the stator 20.

To be more specific, in a case where the vibrator 30 with a weight of about 1.5 g is coupled to the first and second elastic members 50 and 70, the vibrator 30 rarely sags, that is, sags by the height of about 0.0041 mm.

Therefore, it is not necessary to provide an anti-sagging member for preventing the sagging of the vibrator 30 such as a ball bearing between the vibrator 30 and the top of the lower case 7 in order to prevent the vibrator 30 from sagging toward the stator 20.

The fourth elastic plate 72 is secured to the top of the lower case 7 of the case 10. Here, the fourth elastic plate 72 is secured to the top of the lower case 7 via a coupling piece 71. The coupling piece 71 extends from an end of the fourth elastic plate 72 in such a way as to be parallel to the top of the lower case 7. The coupling piece 71 is coupled to portion of the top of the lower case 7, which is adjacent to the third corner 33a of the weight 38.

The fourth elastic plate 72 secured to the top of the lower case 7 via the coupling piece 71 is placed to be substantially parallel to the fourth side surface 34 of the weight 38.

The fifth elastic plate 74 extends from the fourth elastic plate 72 in such a way as to be bent between the fourth elastic plate 72 and the fourth side surface 34 of the weight 38. The fourth elastic plate 74 is placed to be parallel to the fourth side surface 34 of the weight 38. That is, the fifth elastic plate 74 is formed by bending the fourth elastic plate 72 in a third direction facing the fourth side surface 34 of the weight 38.

The sixth elastic plate 76 extends from the fifth elastic plate 74 in such a way as to be bent between the fifth elastic plate 74 and the fourth side surface 34 of the weight 38. The sixth elastic plate 76 is placed to be parallel to the fourth side surface 34 of the weight 38. That is, the sixth elastic plate 76 is formed by bending the fifth elastic plate 74 in a fourth direction that faces the fourth side surface 34 of the weight 38 and is opposite to the third direction.

A portion of the sixth elastic plate 76 is bent to be parallel to the first side surface 31 of the weight 38 and is secured to portion of the first side surface 31, which is located around the fourth corner 34a.

Referring to FIG. 4, the first and second elastic plates 52 and 54 of the first elastic member 50 that are placed to be parallel to each other are spaced apart from each other by a first gap G1, while the second and third elastic plates 54 and 56 of the first elastic member 50 that are placed to be parallel to each other are spaced apart from each other by a second gap G2 that is smaller than the first gap G1. If the first gap G1 is set to be larger than the second gap G2 as in the embodiment of the present invention, the vibration of the horizontal vibration motor 100 can be considerably improved.

In the embodiment of the present invention, the first gap G1 between the first and second elastic plates 52 and 54 is formed to be smaller than a size of the amplitude of the vibrator 30. If the first gap G1 is formed to be larger than a size of the amplitude of the vibrator 30, the third elastic plate 56 may make contact with or collide with the second elastic plate 54.

According to the embodiment of the present invention, the first gap G1 may be 2 or 3 times larger than the second gap G2 sizewise.

Referring to FIG. 4, the fourth and fifth elastic plates 72 and 74 of the second elastic member 70 that are placed to be parallel to each other are spaced apart from each other by the first gap G1, while the fifth and sixth elastic plates 74 and 76 of the second elastic member 70 that are placed to be parallel to each other are spaced apart from each other by the second gap G2 that is smaller than the first gap G1. If the first gap G1 is set to be larger than the second gap G2 as in the embodiment of the present invention, the vibration of the horizontal vibration motor 100 can be considerably improved.

In the embodiment of the present invention, the first gap G1 between the fourth and fifth elastic plates 72 and 74 is formed to be smaller than the amplitude of the vibrator 30. If the first gap G1 is formed to be larger than the amplitude of the vibrator 30, the sixth elastic plate 76 may make contact with or collide with the fifth elastic plate 74.

According to the embodiment of the present invention, the first gap G1 may be 2 or 3 times larger than the second gap G2 sizewise.

Meanwhile, the second elastic plate 54 of the first elastic member 50 and the fifth elastic plate 74 of the second elastic member 70 are driven by first displacement, and the first elastic plate 52 of the first elastic member 50 and the fourth elastic plate 72 of the second elastic member 70 are driven by second displacement that is smaller than the first displacement.

Referring to FIG. 5, a yoke plate 39 may be coupled to the weight 38 so as to prevent the leakage of the magnetic field produced from the magnet 31 secured to the weight 38 and to cause the magnetic field produced from the magnet 31 to face the coil block 25, thereby improving the driving efficiency of the horizontal vibration motor 100.

According to the embodiment of the present invention, when simulating the maximum stress of the first and second elastic members 50 and 70 that move the vibrator 30 in a horizontal direction, the maximum stress of the first and second elastic members 50 and 70 is about 378 MPa. In contrast, when simulating the maximum stress of a plate spring of a conventional vertical vibration motor, the maximum stress of the plate spring of the conventional vertical vibration motor was about 392 MPa.

Generally, the higher the maximum stress applied to the plate spring is, the shorter the lifespan of the plate spring is, and the lower the maximum stress applied to the plate spring is, the longer the lifespan of the plate spring is. Thus, since the maximum stress of the first and second elastic members 50 and 70 is lower than that of the conventional vertical vibration motor, the lifespan of the horizontal vibration motor according to the embodiment of the present invention is slightly longer than that of the conventional vertical vibration motor.

Figure 6:
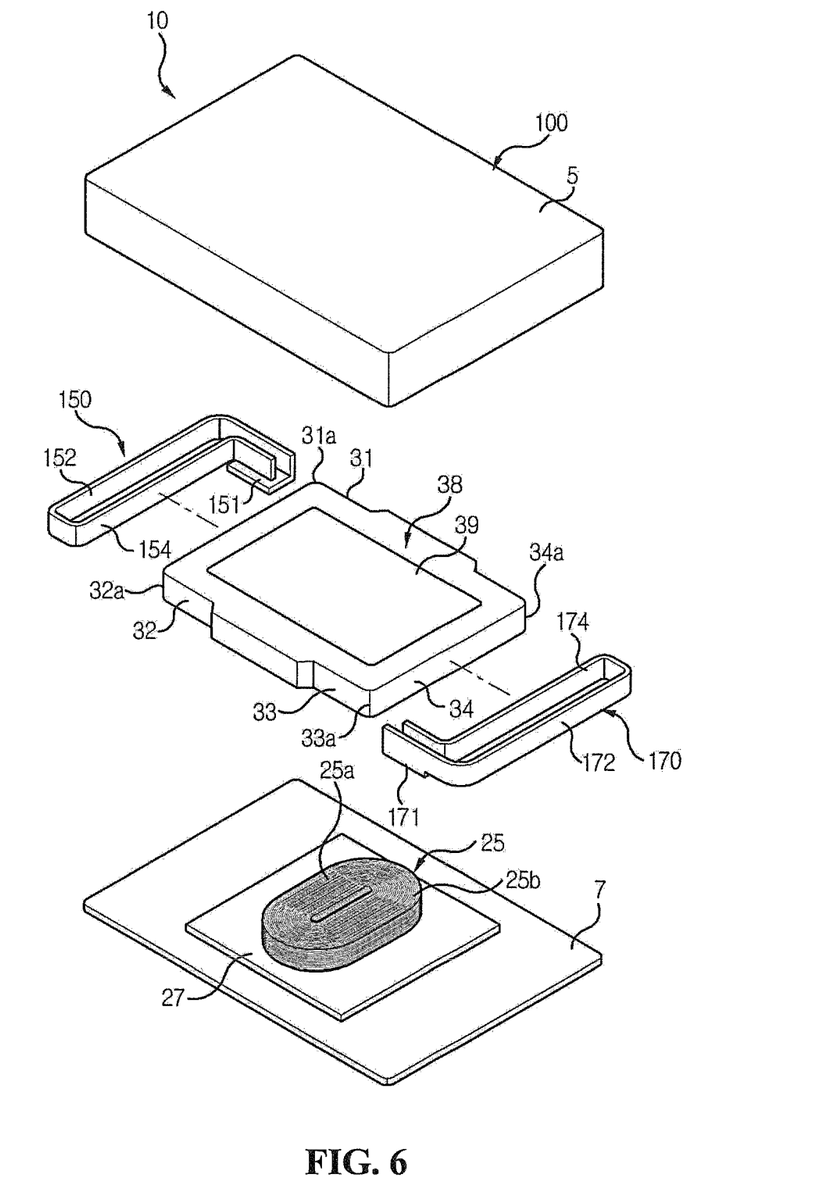
FIG. 6 is an exploded perspective view showing a horizontal vibration motor in accordance with another exemplary embodiment of the present invention.
Figure 7:
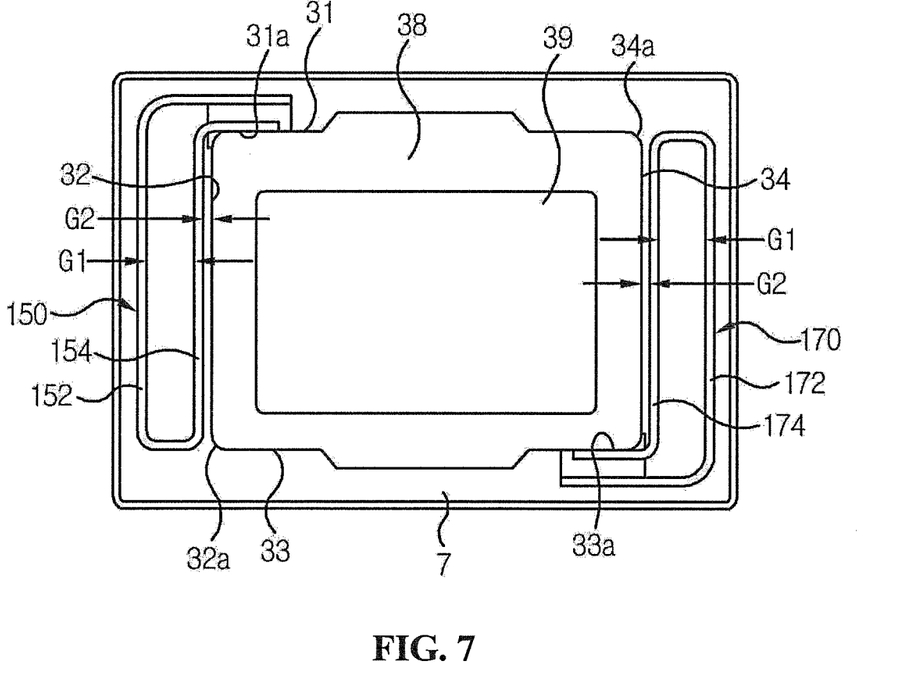
FIG. 7 is a plan view of the horizontal vibration motor shown in FIG. 6.

FIG. 6 is an exploded perspective view showing a horizontal vibration motor in accordance with another embodiment of the present invention. FIG. 7 is a plan view of the horizontal vibration motor shown in FIG. 6. The general construction of the horizontal vibration motor shown in FIGS. 6 and 7 substantially remains the same as the horizontal vibration motor shown in FIGS. 1 to 5, except for the first and second elastic members. Therefore, the duplicated description of the same construction will be omitted, and the same component will carry the same reference numeral.

Referring to FIGS. 6 and 7, a first elastic member 150 includes a first elastic plate 152 and a second elastic plate 154. According to the embodiment of the present invention, the first elastic member 150 functions to drive the vibrator 30, which has been driven to a first side of the stator 20 by the stator 20, to a second side of the stator 20 which is opposite to the first side.

Each of the first and second elastic plates 152 and 154 constituting the first elastic member 150 is formed in the shape of a band, the length of which is larger than width. The first and second elastic plates 152 and 154 are formed to be perpendicular to the top of the lower case 7.

The perpendicular formation of the first and second elastic plates 152 and 154 relative to the top of the lower case 7 enables the vibrator 30 to be elastically supported, and prevents the vibrator 30 from sagging toward the stator 20.

Therefore, it is not necessary to provide an anti-sagging member for preventing the sagging of the vibrator 30 such as a ball bearing between the vibrator 30 and the top of the lower case 7 in order to prevent the vibrator 30 from sagging toward the stator 20.

The first elastic plate 152 is secured to the top of the lower case 7 of the case 10. Here, the first elastic plate 152 is secured to the top of the lower case 7 via a coupling piece 151. The coupling piece 151 extends from an end of the first elastic plate 152 in such a way as to be parallel to the top of the lower case 7. The coupling piece 151 is coupled to portion of the top of the lower case 7, which is adjacent to the first corner 31a of the weight 38.

The first elastic plate 152 secured to the top of the lower case 7 via the coupling piece 151 is placed to be substantially parallel to the second side surface 32 of the weight 38.

The second elastic plate 154 extends from the first elastic plate 152 in such a way as to be bent between the first elastic plate 152 and the second side surface 32 of the weight 38. The second elastic plate 154 is placed to be parallel to the second side surface 32 of the weight 38. That is, the second elastic plate 154 is formed by bending the first elastic plate 152 in a first direction facing the second side surface 32 of the weight 38.

The second elastic plate 154 is coupled to a portion of the first side surface 31 around the first corner 31a.

The second elastic member 170 includes a third elastic plate 172 and a fourth elastic plate 174. In the embodiment of the present invention, the second elastic member 170 functions to drive the vibrator 30, which has been driven to a first side of the stator 20 by the stator 20, to a second side of the stator 20.

Each of the third and fourth elastic plates 172 and 174 constituting the second elastic member 170 is formed in the shape of a band, the length of which is larger than width. The third and fourth elastic plates 172 and 174 are formed to be perpendicular to the top of the lower case 7.

The perpendicular formation of the third and fourth elastic plates 172 and 174 relative to the top of the lower case 7 enables the vibrator 30 to be elastically supported, and prevents the vibrator 30 from sagging toward the stator 20.

Therefore, it is not necessary to provide an anti-sagging member for preventing the sagging of the vibrator 30 such as a ball bearing between the vibrator 30 and the top of the lower case 7 in order to prevent the vibrator 30 from sagging toward the stator 20.

The third elastic plate 172 is secured to the top of the lower case 7 of the case 10. Here, the third elastic plate 172 is secured to the top of the lower case 7 via a coupling piece 171. The coupling piece 171 extends from an end of the third elastic plate 172 in such a way as to be parallel to the top of the lower case 7. The coupling piece 171 is coupled to portion of the top of the lower case 7, which is adjacent to the third corner 33a of the weight 38.

The third elastic plate 172 secured to the top of the lower case 7 via the coupling piece 171 is placed to be substantially parallel to the fourth side surface 34 of the weight 38.

The fourth elastic plate 174 extends from the third elastic plate 172 in such a way as to be bent between the third elastic plate 172 and the fourth side surface 34 of the weight 38. The fourth elastic plate 174 is placed to be parallel to the fourth side surface 34 of the weight 38. That is, the fourth elastic plate 174 is formed by bending the third elastic plate 172 in a third direction facing the fourth side surface 34 of the weight 38.

Portion of the fourth elastic plate 174 is bent to be parallel to the first side surface 31 of the weight 38 and is secured to portion of the third side surface 33, which is located around the third corner 33a.

The first and second elastic plates 152 and 154 of the first elastic member 150 that are placed to be parallel to each other are spaced apart from each other by a first gap G1, while the second elastic plate 154 of the first elastic member 150 and the second side surface 32 of the weight 38 are spaced apart from each other by a second gap G2 that is smaller than the first gap G1. If the first gap G1 is set to be larger than the second gap G2 as in the embodiment of the present invention, the vibration of the horizontal vibration motor 100 can be considerably improved.

In the embodiment of the present invention, the first gap G1 between the first and second elastic plates 152 and 154 is formed to be smaller than the amplitude of the vibrator 30. If the first gap G1 is formed to be larger than the amplitude of the vibrator 30, the second elastic plate 154 may make contact with or collide with the first elastic plate 152.

According to the embodiment of the present invention, the first gap G1 may be 2 or 3 times larger than the second gap G2 sizewise.

The third and fourth elastic plates 172 and 174 of the second elastic member 170 that are placed to be parallel to each other are spaced apart from each other by the first gap G1, while the fourth elastic plate 174 of the second elastic member 170 and the fourth side surface 34 of the weight 38 that are placed to be parallel to each other are spaced apart from each other by the second gap G2 that is smaller than the first gap G1. If the first gap G1 is set to be larger than the second gap G2 as in the embodiment of the present invention, the vibration of the horizontal vibration motor 100 can be considerably improved.

In the embodiment of the present invention, the first gap G1 between the third and fourth elastic plates 172 and 174 is formed to be smaller than the amplitude of the vibrator 30. If the first gap G1 is formed to be larger than the amplitude of the vibrator 30, the fourth elastic plate 174 may make contact with or collide with the third elastic plate 172.

According to the embodiment of the present invention, the first gap G1 may be 2 or 3 times larger than the second gap G2 sizewise.

Meanwhile, the second elastic plate 154 of the first elastic member 150 and the fourth elastic plate 174 of the second elastic member 170 are driven by first displacement, and the first elastic plate 152 of the first elastic member 150 and the third elastic plate 172 of the second elastic member 170 are driven by second displacement that is smaller than the first displacement.

Referring to FIG. 5, a yoke plate 39 may be coupled to the weight 38 so as to prevent the leakage of the magnetic field produced from the magnet 31 secured to the weight 38 and to cause the magnetic field produced from the magnet 31 to face the coil block 25, thereby improving the driving efficiency of the horizontal vibration motor 100.

As described above, the present invention provides a horizontal vibration motor, in which an elastic member for elastically supporting a vibrator vibrating relative to a stator is secured to a side surface of a weight of the vibrator, thus realizing a considerable reduction in volume and thickness, and the structure of the elastic member is improved, thus prolonging the lifespan of the elastic member.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A horizontal vibration motor, comprising:
a stator including a coil block disposed on a bottom plate of a case;
a vibrator including magnets and a weight holding the magnets, the weight having a shape of a rectangular frame, and the magnets being placed over the coil block;
a first elastic member including a first elastic plate secured to a portion of the case corresponding to a first corner of the weight, a second elastic plate bent in a first direction from the first elastic plate, and a third elastic plate bent in a second direction opposite to the first direction from the second elastic plate and secured to a portion around a second corner that is adjacent to the first corner; and
a second elastic member including a fourth elastic plate secured to a portion of the bottom plate corresponding to a third corner that is located in a diagonal direction of the first corner, a fifth elastic plate bent in the first direction from the fourth elastic plate, and a sixth elastic plate bent in the second direction from the fifth elastic plate and secured to a fourth corner that is located in a diagonal direction of the second corner;
wherein a gap between the first and second elastic plates is wider than a gap, between the second and third elastic plates, and a gap between the fourth and fifth elastic plates is wider than a gap between the fifth and sixth elastic plates.

2. The horizontal vibration motor as set forth in claim 1, wherein the gap between the first and second plates or the gap between the fourth and fifth elastic plates is smaller than an amplitude of vibration of the vibrator.

3. The horizontal vibration motor as set forth in claim 1, wherein the gap between the first and second elastic plates is two to three times larger than the gap between the second and third elastic plates.

4. The horizontal vibration motor as set forth in claim 1, wherein the second and fifth elastic plates are driven by a first displacement, and the first and fourth elastic plates are driven by a second displacement that is smaller than the first displacement.

5. The horizontal vibration motor as set forth in claim 1, wherein each of the first and second elastic members is formed in a shape of a band, a length of which is larger than a width thereof, and wherein the first and second elastic members are placed to be perpendicular to the bottom plate.

6. The horizontal vibration motor as set forth in claim 1, wherein the first to third elastic plates are placed to be parallel to each other, and the fourth to sixth elastic plates are placed to be parallel to each other.

7. The horizontal vibration motor as set forth in claim 1, wherein the stator further comprises a yoke plate mounted to on the weight.

* * * * *